(12) United States Patent  
Yamazaki et al.

(10) Patent No.: US 8,634,012 B2  
(45) Date of Patent: Jan. 21, 2014

(54) SOLID-STATE IMAGE PICKUP DEVICE AND METHOD OF DRIVING THE SAME

(75) Inventors: Tatsuhiko Yamazaki, Zama (JP); Shintaro Takenaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 13/076,364

(22) Filed: Mar. 30, 2011

(65) Prior Publication Data

US 2011/0242383 A1  Oct. 6, 2011

(30) Foreign Application Priority Data

Apr. 1, 2010  (JP) ................................ 2010-085471

(51) Int. Cl.  
*H04N 5/335* (2011.01)  
*H04N 5/235* (2006.01)

(52) U.S. Cl.  
USPC .......................................... 348/322; 348/362

(58) Field of Classification Search  
USPC .................. 348/302, 395, 312, 319, 322, 362  
See application file for complete search history.

(56) References Cited

U.S. PATENT DOCUMENTS

| | | | | |
|---|---|---|---|---|
| 7,679,593 B2* | 3/2010 | Nakai et al. | ...................... | 345/94 |
| 7,893,979 B2* | 2/2011 | Gomi et al. | .................... | 348/304 |
| 7,911,518 B2* | 3/2011 | Yosefin | ......................... | 348/273 |
| 2007/0040105 A1* | 2/2007 | Kido | ...................... | 250/214 DC |
| 2008/0284883 A1 | 11/2008 | Asahi | | |
| 2009/0295971 A1* | 12/2009 | Tsuchiya | ...................... | 348/311 |
| 2010/0188518 A1* | 7/2010 | Inuiya | ........................ | 348/220.1 |

FOREIGN PATENT DOCUMENTS

| | | |
|---|---|---|
| CN | 1976387 A | 6/2007 |
| CN | 101119433 A | 2/2008 |
| CN | 101483712 A | 7/2009 |
| CN | 101594491 A | 12/2009 |
| CN | 101690158 A | 3/2010 |
| GB | 2338365 A | 12/1999 |
| JP | 2005-123758 A | 5/2005 |
| JP | 2006-074440 A | 3/2006 |
| JP | 2008-028608 A | 2/2008 |
| JP | 2008-288903 A | 11/2008 |
| JP | 2008-288946 A | 11/2008 |
| JP | 2009-124317 A | 6/2009 |
| WO | 02/063869 A | 8/2002 |
| WO | 2009/099116 A | 8/2009 |

* cited by examiner

*Primary Examiner* — Trung Diep  
(74) *Attorney, Agent, or Firm* — Canon U.S.A., Inc. IP Division

(57) ABSTRACT

Provided is a solid-state image pickup device that includes: a pixel portion having a plurality of pixels that are arranged in a two-dimensional array and generate pixel signals; a readout row counter that generates row addresses for reading the pixel portion; a first reset row counter that generates a row address for resetting a first field of the pixel portion; a second reset row counter that generates a row address for resetting a second field of the pixel portion; a selector that selects one of the row addresses generated by the readout row counter, the first reset row counter, and the second reset row counter; and pixel driving units that respectively select two rows: an odd-numbered row and a neighboring even-numbered row of the pixel portion corresponding to the selected row address.

14 Claims, 7 Drawing Sheets

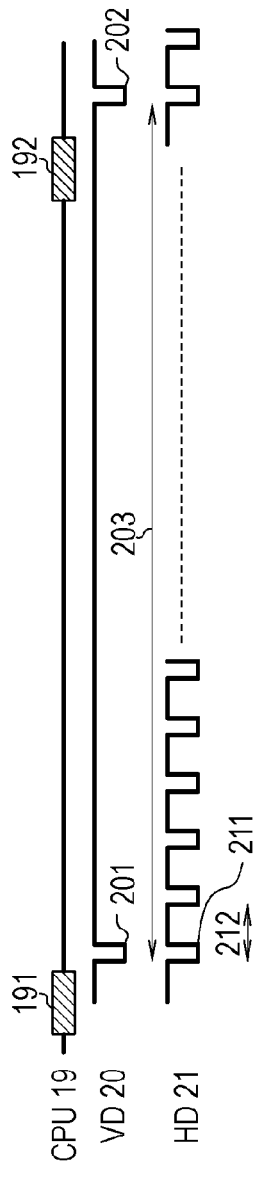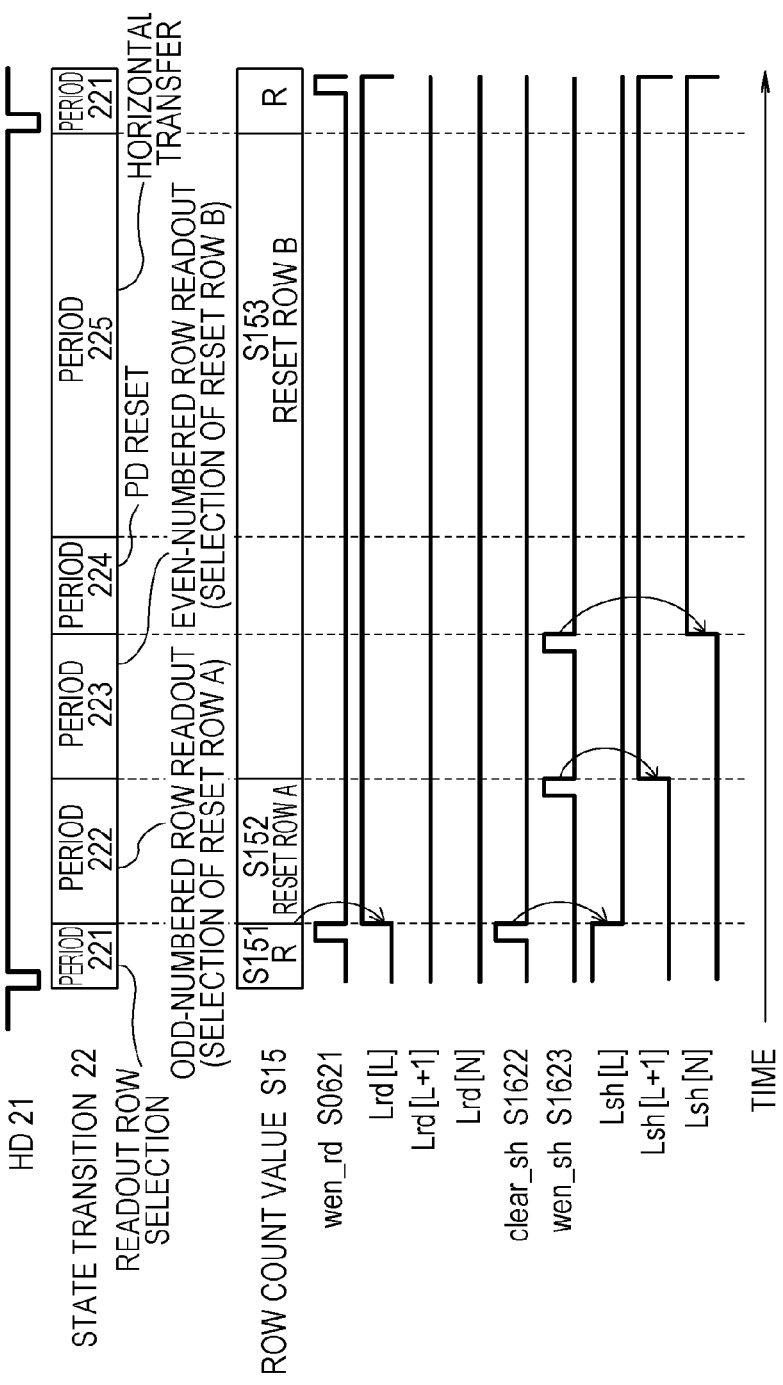
FIG. 2A
FIG. 2B

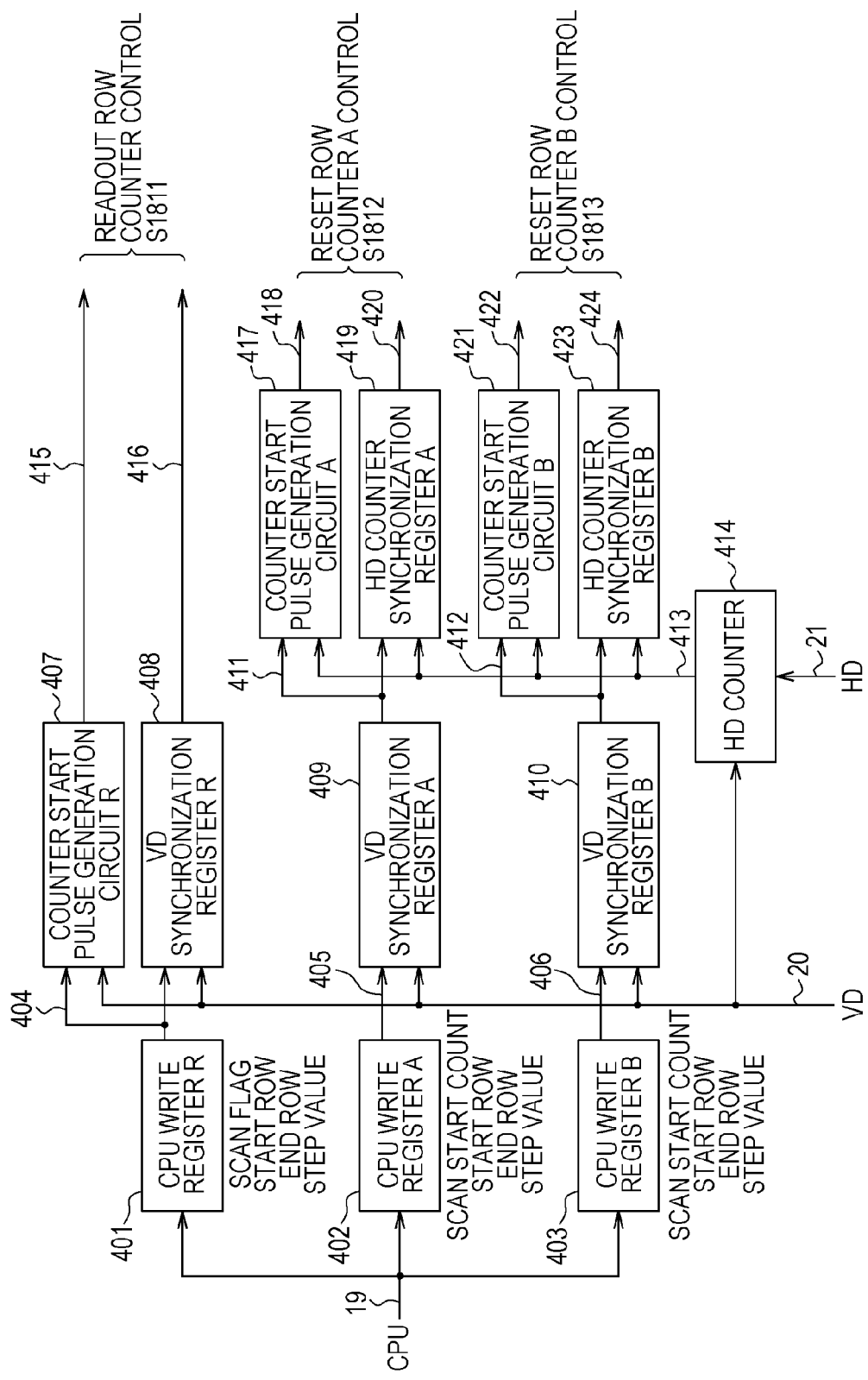

SOLID-STATE IMAGE PICKUP DEVICE AND METHOD OF DRIVING THE SAME

BACKGROUND OF THE INVENTION

1. Field of the Invention

The present invention relates to solid-state devices and methods of driving the devices.

2. Description of the Related Art

Recently, solid-state image pickup devices including more than millions of pixels have been used for digital cameras, allowing high precision still images to be captured. Also in the case of shooting moving images, it is required that solid-state image pickup devices read out images at high frame rates to enable moving images to be shot without jerkiness. In the case of high-rate reading, since an image accumulation period per frame of photoelectric conversion elements in the pixel portion of a solid-state image pickup device is short, there is a problem in that sufficient exposure amounts are not obtained particularly for dark objects. As means for obtaining sufficient exposure amounts with a limited exposure period, Japanese Patent Laid-Open No. 2006-74440 discloses a method of using two modes of thinning out in a CCD-type image pickup device. According to Japanese Patent Laid-Open No. 2006-74440, one of the two modes is a mode in which fine accumulation period control is performed using an electronic shutter, in a case where the accumulation period is within one vertical scan period. The other mode is a mode in which the accumulation period is fixed without using an electronic shutter, and the amplification factor of signal amplifying means is changed in accordance with the brightness of objects, in a case where the accumulation period exceeds one vertical scan period.

In the solid state image pickup device disclosed in Japanese Patent Laid-Open No. 2006-74440, since switching is performed between two thinning-out reading modes, the method of thinning out changes at the time of switching. In other words, two rows are skipped for every three rows during reading in the case of a shorter accumulation period (for example, $1/30$ seconds), whereas only one row is skipped for every three rows during reading in the case of a longer accumulation period (for example, $1/15$ seconds). This may be recognizable depending on a shot scene, resulting in discomfort. In addition, in Japanese Patent Laid-Open No. 2006-74440, the amplification factor of a circuit is changed for scenes with accumulation periods of $1/30$ to $1/15$ seconds. A change in the amplification factor results in a change in the noise of the circuit. Hence, when dark objects are shot in particular, image quality changes at the time of switching between the accumulation periods. This is also recognizable when viewing, resulting in discomfort.

SUMMARY OF THE INVENTION

The solid-state image pickup device of the present invention includes: a pixel portion having a plurality of pixels that are arranged in a two-dimensional matrix and generate pixel signals through photoelectric conversion; a readout row counter that generates row address for reading the pixel portion; a first reset row counter that generates a row address for resetting a first field of the pixel portion; a second reset row counter that generates a row address for resetting a second field of the pixel portion, the second field following the first field; a selector that selects one of the row addresses respectively generated by the readout row counter, the first reset row counter, and the second reset row counter; and a pixel driving unit that selects a row of the pixel portion corresponding to the selected row address. The pixel driving unit is provided with a first operation mode in which rows of the pixel portion to be read in the first field are sequentially scanned and the pixel signals of pixels of the pixel portion to be read in the first field are reset, then rows of the pixel portion to be read in the second field are sequentially scanned and the pixel signals of pixels of the pixel portion to be read in the second field are reset, then the pixel signals of the pixels of the first field are sequentially read, and then the pixel signals of the pixels of the second field are sequentially read.

Further features of the present invention will become apparent from the following description of exemplary embodiments with reference to the attached drawings.

BRIEF DESCRIPTION OF THE DRAWINGS

FIGS. 2A and 2B are schematic timing diagrams illustrating a method of driving the solid-state image pickup device.

FIG. 3 is a block diagram illustrating an exemplary configuration of a row counter control unit according to a first embodiment.

DESCRIPTION OF THE EMBODIMENTS

First Embodiment

Figure 1A:
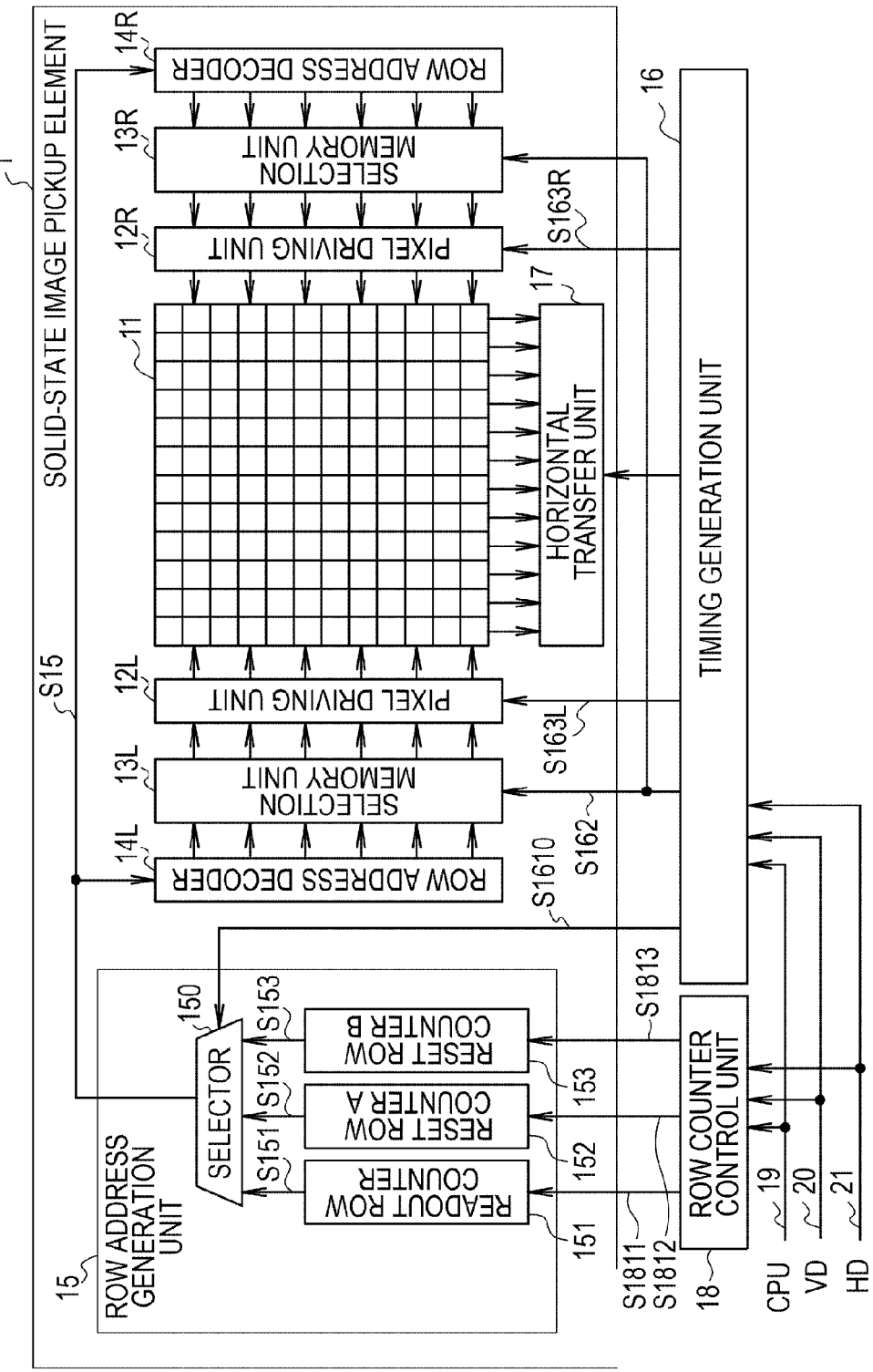
FIGS. 1A and 1B illustrate an exemplary configuration of a solid-state image pickup device.

FIG. 1A is a block diagram illustrating an exemplary configuration of a solid-state image pickup device according to a first embodiment of the present invention. A solid-state image pickup element 1 includes a pixel portion 11 and pixel driving units 12L and 12R. The pixel portion 11 is formed of a plurality of pixels arranged in a two-dimensional array of rows and columns. The pixel driving units 12L and 12R generate, respectively for odd-numbered rows and even-numbered rows, signals for driving the pixels, in other words, a transfer signal for transferring electric charges accumulated in photodiodes, and a row selection signal for selecting the pixels of a specific row of the array, for example. The pixel portion 11 includes the plurality of pixels each generating a pixel signal through photoelectric conversion performed by a photoelectric conversion element (photodiode). Each pixel may be an amplification-type pixel including a photoelectric conversion element and an amplifier unit for outputting a voltage signal based on the charge accumulated in the photoelectric conversion element, for example. The solid-state image pickup element 1 includes selection memory units 13L and 13R for respectively storing row selection signals for the odd-numbered and even-numbered rows, row address decoders 14L and 14R for selecting one row corresponding to a row count value S15, a row address generation unit 15, a timing generation unit 16, and a row counter control unit 18. The row address generation unit 15 includes a readout row counter 151, a reset row counter A (152), a reset row counter B (153), and a selector 150. The selector 150 selects one of the row addresses output from the three row counters 151 to 153 and outputs it as the row count value S15. The readout row counter 151 generates a readout row address of the pixel portion 11. The first reset row counter A (152) generates a row address indicating a row to be reset in an odd-numbered field (first field) of the pixel portion 11. The second reset row counter B (153) generates a row address indicating a row to be reset in an even-numbered field (second field) of the pixel portion 11. The odd-numbered field and even-numbered field constitute one frame. The selector 150 selects one of the row addresses generated by the readout row counter 151, the reset row counter A (152), and the reset row counter B (153). The row counter control unit 18 outputs counter control signals S1811 to S1813, such as counter start pulses, respectively to the three row counters 151 to 153, based on a communication signal 19, a vertical synchronization (VD) signal 20, and a horizontal synchronization (HD) signal 21 from an external CPU. The row counter control unit 18 controls the row counters 151 to 153. The row address decoders 14L and 14R decode a row address selected by the selector 150. The selection memory units 13L and 13R receive output bits from the row address decoders 14L and 14R, and store the states thereof. The pixel driving units 12L and 12R output row selection signals corresponding to the output bits stored in the selection memory units 13L and 13R. The timing generation unit 16 generates a row address generation unit selection signal S1610 for selecting one of the three row counters 151 to 153 on the basis of the communication signal 19 from an external CPU, the vertical synchronization signal 20, and the horizontal synchronization signal 21. Further, the timing generation unit 16 generates a memory unit control signal S162 which is common to the odd-numbered rows and even-numbered rows and controls the selection memory units 13L and 13R, and pixel driving signals S163L and S163R for controlling the pixel driving units 12L and 12R. The first pixel driving unit 12L selects an odd-numbered row of the pixel portion 11 corresponding to a row address selected by the selector 150. The second pixel driving unit 12R selects an even-numbered row of the pixel portion 11 corresponding to a row address selected by the selector 150. The first and second pixel driving units 12L and 12R are configured to control the operations of the pixels through logical sums or logical products of the outputs of the corresponding selection memory units 13L and 13R and a signal, which is not illustrated, provided from the timing generation unit 16. The solid-state image pickup element 1, the timing generation unit 16, and the row counter control unit 18 may or may not be integrated on the same semiconductor.

Figure 1B:
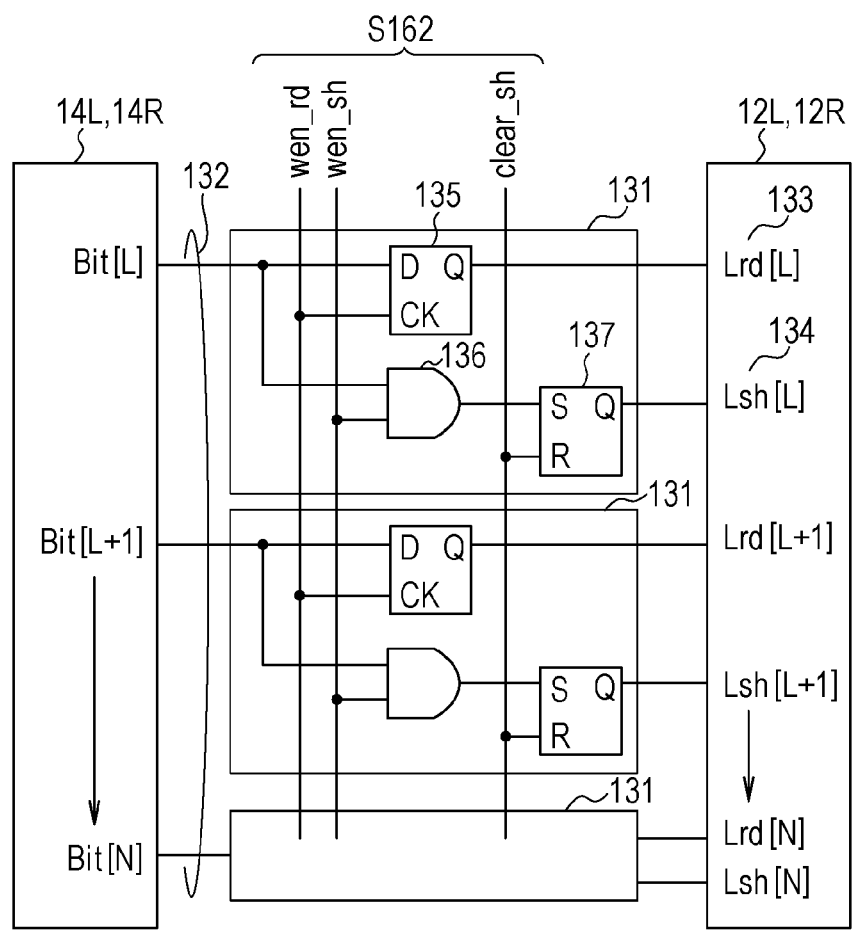

FIG. 1B is a circuit diagram illustrating an exemplary configuration of the selection memory units 13L and 13R illustrated in FIG. 1A. Each of the selection memory units 13L and 13R includes row selection storage circuits 131 provided in a number equal to half the number of rows of the pixel portion 11. The row selection storage circuit 131 is configured to include a D latch 135, a logical product (AND) circuit 136, and an SR latch 137. Input to the row selection storage circuits 131 are one bit of a decoded signal 132 output from the row address decoders 14L and 14R, a write enable signal wen_rd, a clear signal clear_sh for clearing the SR latch 137, and a set signal wen_sh, which are the memory unit control signals 5162. The write enable signal wen_rd is input to a clock terminal (CK) of the D latch 135, one bit within the decoded signal 132 is input to a data terminal (D), and a Q output signal of the D latch 135 becomes a row selection signal Lrd (133). The clear signal clear_sh is input to a reset terminal (R) of the SR latch 137. The set signal wen_sh and one bit within the decoded signal 132 are input to the AND circuit 136 and the logical product thereof are output to a set terminal (S) of the SR latch 137. The Q output signal of the SR latch 137 becomes a row selection signal Lsh (134) for selecting a row whose pixels are to be reset. The row selection signals Lrd (133) for selecting rows whose pixel signals are to be transferred, generated respectively in the selection memory units 13L and 13R, and the row selection signals Lsh (134) for selecting rows whose pixels are to be reset are input to the pixel driving units 12L and 12R. Thereby the pixel signals of the corresponding rows of the pixel portion 11 selected by the row address decoders 14L and 14R can be transferred and reset.

FIGS. 2A and 2B are schematic timing diagrams illustrating the operations of the row counter control unit 18 illustrated in FIG. 1A, the timing generation unit 16, and the selection memory units 13L and 13R. FIG. 2A illustrates input timings of externally input signals. The communication signal 19 from a CPU, which is prior to a pulse 201 input as the vertical synchronization (VD) signal 20, includes a communication signal 191 for an operation to be performed during the next vertical synchronization period 203. The vertical synchronization period 203 is formed of a plurality of horizontal synchronization pulses 211 input as the horizontal synchronization (HD) signal 21.

FIG. 2B is a schematic timing diagram illustrating a method of driving the solid-state image pickup device during a single horizontal synchronization period 212 illustrated in FIG. 2A. The operation during the horizontal synchronization period 212 is roughly divided into processing periods 221 to 225 illustrated as state transition 22. The row count value S15 becomes an output signal S151 of the readout row counter 151 during period 221 as a result of a row address generation unit selection signal S1610 of the timing generation unit 16, and becomes an output signal S152 of the reset row counter A (152) during period 222. The row count value S15 becomes an output signal S153 of the reset row counter B (153) in other periods.

First, the operation of transferring pixel signals of a row during the horizontal synchronization period 212 is described. First, during period 221, the timing generation unit 16 generates a pulse of the write enable signal wen_rd. The decoded signal 132 of the output signal S151 of the readout row counter 151 is latched by the D latch 135. Here, the illustrated example is a case in which the output signal S151 of the readout row counter 151 selects rows L. The level of the row selection signal Lrd (133) indicating a row whose pixel signal is to be transferred goes high only for rows L, whereas those for other rows, rows (L+1) to N, remain low. At this time, the row count value S15 is common to the row address decoders 14L and 14R, and the write enable signal wen_rd is also common to the selection memory units 13L and 13R. Hence, the pixel driving units 12L and 12R select respectively row L from among the group of only odd-numbered rows and row L from among the group of only even-numbered rows. During period 222, the pixel driving unit 12L is controlled by the timing generation unit 16, and pixel signals of row L of the group of only odd-numbered rows in the pixel portion 11 are vertically transferred to a horizontal transfer unit 17. During period 223, the pixel driving unit 12R is controlled by the timing generation unit 16, and pixel signals of row L of the group of only even-numbered rows in the pixel portion 11 are vertically transferred to the horizontal transfer unit 17. During period 225, the pixel signals of row L of the odd-numbered rows and row L of the even-numbered rows which have been vertically transferred under the control of the timing generation unit 16 are horizontally transferred in the horizontal transfer unit 17 and become an output pixel signal of the solid-state image pickup element 1.

Next, the reset operation of the pixel signals of a row during the horizontal synchronization period 212 will be described. The timing generation unit 16 generates a pulse of the clear signal clear_sh during period 221, and generates a pulse of the set signal wen_sh during period 222 and period 223. Here, the illustrated example is an example in which an output signal S152 of the reset row counter A (152) selects rows L+1, the output signal S153 of the reset row counter B (153) selects rows N, and rows L have been selected in the previous horizontal synchronization period 212.

During period 221, all the SR latches 137 are reset by the pulse of the clear signal clear_sh, and the level of Lsh [L], which has been selected, changes from a high level to a low level. During period 222, the level of Lsh [L+1] changes from a low level to a high level due to the output of the AND circuit 136, which receives, as inputs, the set signal wen_sh and the decoded signal 132 obtained by decoding row L+1 selected by the output signal S152 of the reset row counter A (152). During period 223, the level of Lsh [N] changes from a low level to a high level due to the output of the AND circuit 136, which receives, as inputs, the set signal wen_sh and the decoded signal 132 obtained by decoding row N selected by the output signal S153 of the reset row counter B (153). At this time, the row count value S15 is common to the row address decoders 14L and 14R, and the clear signal clear_sh, and the set signal wen_sh are also common to the selection memory units 13L and 13R. Hence, the pixel driving units 12L and 12R respectively select row L+1 of the odd-numbered rows and row L+1 of the even-numbered rows, and respectively select row N of the odd-numbered rows and row N of the even-numbered rows. During period 224, the pixel driving units 12L and 12R are controlled by the timing generation unit 16, and the pixels of the selected row L+1 of the odd-numbered rows and row L+1 of the even-numbered rows of the pixel portion 11, and the pixels of row N of the odd-numbered rows and row N of the even-numbered rows of the pixel portion 11 are reset. As a result, in the configuration described above, a pair of neighboring odd-numbered and even-numbered rows can be read, and two pairs of neighboring odd-numbered and even-numbered rows can be reset, during the horizontal synchronization period 212.

FIG. 3 illustrates an exemplary configuration of the row counter control unit 18 according to the first embodiment. Hereinafter, description is made of a method of driving the solid-state image pickup device allowing an accumulation time to be continuously set irrespective of whether the exposure period is shorter or longer than a vertical synchronization period. A CPU write register R (401) is a register for control of the readout row counter 151 performed through communication started by the CPU 19. The CPU write register R (401) stores a readout scan flag, a readout start row, a readout end row, and a step value for counting up performed by the readout row counter. A CPU write register A (402) is a register for controlling the reset row counter A (152) performed through communication from the CPU 19, and stores a reset scan start count, a reset start row, a reset end row, and a step value for counting up performed by the reset row counter A. A CPU write register B (403) is a register for control of the reset row counter B (153) performed through communication started by the CPU 19, and stores a reset scan start count, a reset start row, a reset end row, and a step value for counting up performed by the reset row counter B. A counter start pulse generation circuit R (407), when the readout scan flag stored in the CPU write register A (402) is not "0" (scanning is off), generates a start pulse 415 of the readout row counter 151 at the timing of the vertical synchronization signal 20.

At the timing of the vertical synchronization signal 20, the readout end row and the step value for counting up performed by the readout row counter, stored in the CPU write register R (401), are copied and stored in a VD synchronization register R (408), and are input to the readout row counter 151 through a signal line 416. At the timing of the vertical synchronization signal 20, the reset scan start count, the reset end row, the step value for counting up performed by the reset row counter A, stored in the CPU write register A (402) are copied and stored in a VD synchronization register A (409). At the timing of the vertical synchronization signal 20, the reset scan start count, the reset start row, the reset end row, and the step value for counting up performed by the reset row counter B, stored in the CPU write register B (403) are copied and stored in a VD synchronization register B (410). An HD counter 414 is a counter which is reset at the timing of the vertical synchronization signal 20, and performs counting up at the timing of the horizontal synchronization signal 21.

When the horizontal synchronization signal 21 is continuously input and the count value of the HD counter 414 matches the reset scan start count stored in the VD synchronization register A (409), a counter start pulse generation circuit A (417) and an HD counter synchronization register A (419) perform the following operations. First, the counter start pulse generation circuit A (417) generates a start pulse 418 for the reset row counter A (152). The reset end row and the step value for counting up performed by the reset row counter A, stored in the VD synchronization register A (409), are copied and stored in the HD counter synchronization register A (419) and output to the reset row counter A (152) as a register value 420.

Similarly, when the count value of the HD counter 414 matches the reset scan start count stored in the VD synchronization register B (410), a counter start pulse generation circuit B (421) and an HD counter synchronization register B (423) perform the following operations. First, the counter start pulse generation circuit B (421) generates a start pulse 422 for the reset row counter B (153). The reset end row and the step value for counting up performed by the reset row counter B, stored in the VD synchronization register B (410), are copied and stored in the HD counter synchronization register B (423) and output to the reset row counter B (153) as a register value 424.

Figure 4:
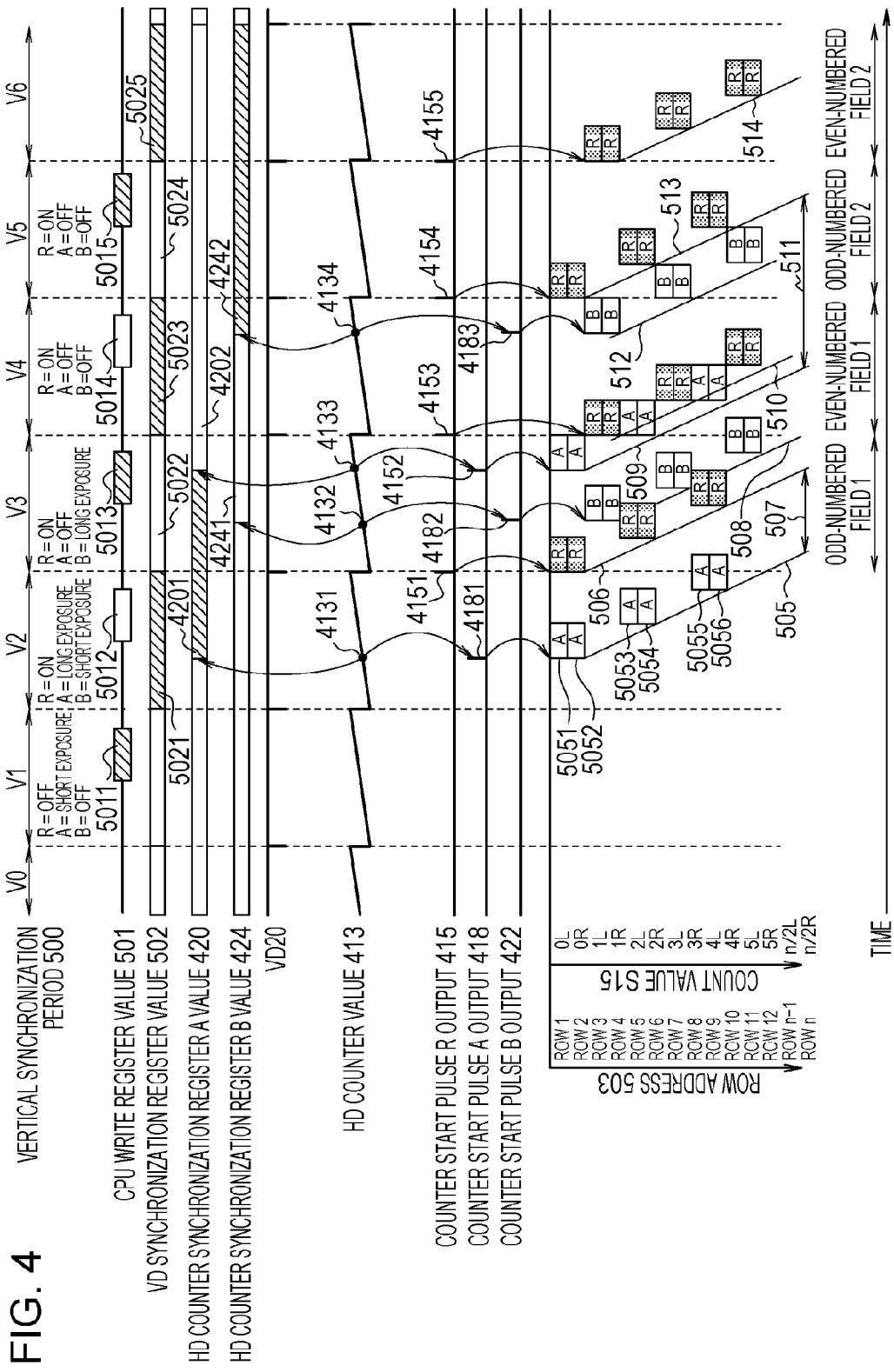
FIG. 4 is a timing diagram illustrating the operation of the solid-state image pickup device according to the first embodiment.

FIG. 4 is a timing diagram illustrating the operation of the row counter control unit 18 according to the first embodiment illustrated in FIG. 3, and the operations of the readout row counter 151, the reset row counter A (152), and the reset row counter B (153) based on the control signal output from the row counter control unit 18. FIG. 4 illustrates the operations of respective portions while a vertical synchronization period 500 proceeds from period V0 to period V6 due to the vertical synchronization signal 20. A CPU write register value 501 shows the timings at which writing is performed for the CPU write register R (401), the CPU write register A (402), and the CPU write register B (403) through communication started by the CPU 19.

A VD synchronization register value 502 shows the timings at which the content of the CPU write register value 501 is copied to the VD synchronization register R (408), the VD synchronization register A (409), and the VD synchronization register B (410) in synchronization with the vertical synchronization signal 20. An HD counter value (413) illustrates how the count value of the counter which is the output of the HD counter 414 counts up, and the count value is reset to zero in synchronization with the vertical synchronization signal 20, and counts up by one every time the horizontal synchronization signal 21 is input. The HD counter synchronization register A value 420 is an output of the HD counter synchronization register A (419) and shows the times at which the content of the VD synchronization register A (409) is copied with reference to the HD counter value (413). The HD counter synchronization register B value 424 is an output of the HD counter synchronization register B (423) and shows the times at which the content of the VD synchronization register B (410) is copied with reference to the HD counter value (413). The counter start pulse R output (415) shows the pulse output times of the counter start pulse generation circuit R (407). The counter start pulse A output (418) shows the pulse output timings of the counter start pulse generation circuit A (417). The counter start pulse B output (422) shows the pulse output timings of the counter start pulse generation circuit B (421).

Row address 503 shows the respective addresses of the rows of the pixel portion 11, in correspondence with the row count values S15 which are input for the row address decoders 14L and 14R. For example, row 1 of the row address 503 corresponds to the count value 0 for the row address decoder 14L, and row 2 of the row address 503 corresponds to the count value 0 for the row address decoder 14R. Reset scans A (505, 509) show reset scans performed by the reset row counter A (152). For example, in the reset scan A (505), it is shown that reset rows 5051, 5053, and 5055 consist of rows selected by the row address decoder 14L, and reset rows 5052, 5054, and 5056 consist of rows selected by the row address decoder 14R. Similarly, reset scans B (508, 512) show reset scans performed by the reset row counter B (153), and readout scans 506, 510, 513, and 514 show readout scans performed by the readout row counter 151.

The operation illustrated in FIG. 4 will now be described. First, in period V1, through communication 5011 started by the CPU 19, a readout scan flag is set to "0" (scan is off) in the CPU write register R (401) so as to instruct prohibition of a readout scan. An HD counter value (4131) is written into the CPU write register A (402) as a reset scan start count. Similarly, "0" is written as a reset start row, "n/2−1" is written as a reset end row, and "2" is written as a step value for counting up performed by the reset row counter A. In the CPU write register B (403), a value larger than the HD counter value (413) corresponding to one vertical synchronization period is set as a reset scan start count, whereby a reset scan can be practically prohibited.

During period V2, first, the respective CPU write register values 501 written through the communication 5011 are copied (5021) to the VD synchronization register R (408), the VD synchronization register A (409), and the VD synchronization register B (410). Then, when the HD counter value (413) matches the HD counter value (4131), which is the reset scan start count stored in the VD synchronization register A (409), the VD synchronization register A (409) is copied (4201) to the HD counter synchronization register A (419). Further, the counter start pulse generation circuit A (417) generates a start pulse 4181 for the reset row counter A (152). Upon receipt of the start pulse 4181, the reset row counter A (152) starts the reset scan A (505). During the reset scan A (505), the reset row counter A (152) refers to an HD counter synchronization register A value (4201). During the horizontal synchronization period of the start pulse 4181, the reset row counter A (152) starts counting from "0", which is a reset start row, and resets rows 1 and 2 of the pixel portion 11 (5051, 5052). In the next horizontal synchronization period, the reset row counter A (152) outputs a value, to which the step value "2" for counting up has been added, and resets rows 5 and 6 of the pixel portion 11 (5053, 5054). After this, the reset scans are performed until the reset end row "n/2−1" is reached, by adding the step value "2" for every horizontal synchronization period.

Further, in period V2, the following is written into the CPU write register R (401) through communication 5012: "1" (scan is on) as a readout flag, "0" as a readout start row, "n/2−1" as a readout end row, and "2" as a step value for counting up performed by the readout row counter. The following is written into the CPU write register A (402): an HD counter value (4133) as a reset scan start count, "0" as a reset start row, "n/2−1" as a reset end row, and "2" as a step value for counting up performed by the reset row counter A. The following is written into the CPU write register B (403): an HD counter value (4132) as a reset scan start count, "1" as a reset start row, "n/2" as a reset end row, and "2" as a step value for counting up performed by the reset row counter A.

During period V3, first, the CPU write register value 501 written through communication 5012 is copied (5022) to the VD synchronization register. The counter start pulse generation circuit R (407) generates a start pulse 4151, since the readout scan flag is "1" (scan is on). Upon receipt of the start pulse 4151, the readout row counter 151 starts a readout scan (506) on the basis of the settings of the readout start row "0", the readout end row "n/2−1", and the step up value "2" for counting up performed by the readout counter. The readout scan (506) is a process of reading odd-numbered field 1 of the pixel portion 11 which has been reset by the reset scan A (505), and a time difference between the reset scan A (505) and the readout scan (506) is an exposure period 507.

Next, when the HD counter value (413) matches an HD counter value (4132), which is the reset scan start count stored in the VD synchronization register B (410), the VD synchronization register B (410) is copied (4241) to the HD counter synchronization register B (423). Further, the counter start pulse generation circuit B (421) generates a start pulse 4182 for the reset row counter B (153). Upon receipt of the start pulse 4182, the reset row counter B (153) starts a reset scan B (508) on the basis of the reset start row "1", the reset end row "n/2", and the step value "2" for counting up. The pixels of the even-numbered field formed of rows 3, 4, 7, 8, . . . are reset.

Next, when the HD counter value (413) matches an HD counter value (4133), which is the reset scan start stored in the VD synchronization register A (409), the VD synchronization register A (409) is copied (4202) to the HD counter synchronization register A (419). Further, the counter start pulse generation circuit A (417) generates a start pulse 4152 for the reset row counter A (152). Upon receipt of the start pulse 4152, the reset row counter A (152) starts a reset scan A (509). The pixels of the odd-numbered field formed of rows 1, 2, 5, 6, . . . are reset.

After this, similarly, setting for a readout scan 510 and a reset scan B (512) during period V4 is made through communication 5013, and setting for a readout scan 513 during period V5 is made through communication 5014, as is illustrated in the figure. The readout scan 513 is a process of reading odd-numbered field 2 of the pixel portion 11 which has been reset by the reset scan A (509), and a time difference between the reset scan A (509) and the readout scan 513 is an exposure period 511. Here, it is illustrated that setting is possible such that the exposure period 507 is shorter than the vertical synchronization period, whereas the exposure period 511 is longer than the vertical synchronization period, and this can be controlled by the timing, for the reset operation, of the communication signal 19 from the CPU. In other words, the communication 5012 for the readout scan 506 for the exposure period 507 is in period V2 and the communication 5011 for the corresponding reset scan A (505) is in period V1, and hence the difference is one vertical scan period. On the other hand, when the communication 5014 for the readout scan 513 is during period V4, and the communication 5012 for the corresponding reset scan A (509) is performed in period V2, that is, two vertical scan periods in advance, the exposure period 511 is obtained. Note that the reset scan 509 of odd-numbered field 2 is performed before the readout scan 510 of even-numbered field 1. However, since scanning is performed in the reset scan 509 such that the readout rows of even-numbered field 1 are skipped due to the step value "2" for counting up, the readout rows of even-numbered field 1 are not reset before being read.

The pixel driving units 12L and 12R select the rows of the pixel portion 11 as a pair of one odd-numbered row and one neighboring even-numbered row in accordance with a row address selected by the selector 150. The exposure period 507 in a shorter accumulation period operation (second operation mode) is shorter than one vertical synchronization period, and is short compared with one field cycle. In the pixel portion 11, during the shorter accumulation period operation with the exposure period 507, odd-numbered pairs of rows of the pixel portion 11 selected by the pixel driving units 12L and 12R are sequentially scanned by the reset scan 505, and the pixel signals of the pixels of odd-numbered field 1 are reset. Then, the odd-numbered pairs of rows of the pixel portion 11 selected by the pixel driving units 12L and 12R are sequentially scanned by the readout scan 506, and the pixel signals of the pixels of odd-numbered field 1 are read. After this, even-numbered pairs of rows of the pixel portion 11 selected by the pixel driving units 12L and 12R are sequentially scanned, and the pixel signals of the pixels of even-numbered field 1 are reset. Then, the even-numbered pairs of rows of the pixel portion 11 selected by the pixel driving units 12L and 12R are sequentially scanned, and the pixel signals of the pixels of even-numbered field 1 are read.

The exposure period 511 in a longer accumulation period operation (first operation mode) is longer than one vertical synchronization period, and is long compared to one field cycle. In the pixel portion 11, during the longer accumulation period operation with the exposure period 511, odd-numbered pairs of rows of the pixel portion 11 selected by the pixel driving units 12L and 12R are sequentially scanned, and the pixel signals of the pixels of odd-numbered field 2 are reset. Then, even-numbered pairs of rows of the pixel portion 11 selected by the pixel driving units 12L and 12R are sequentially scanned, and the pixel signals of the pixels of even-numbered field 2 are reset. After this, the odd-numbered pairs of rows of the pixel portion 11 selected by the pixel driving units 12L and 12R are sequentially scanned, and the pixel signals of the pixels of odd-numbered field 2 are read. Then, the even-numbered pairs of rows of the pixel portion 11 selected by the pixel driving units 12L and 12R are sequentially scanned, and the pixel signals of the pixels of even-numbered field 2 are read.

When the longer accumulation period operation with the exposure period 511 is successively performed after the shorter accumulation period operation with the exposure period 507, the following operation is performed. The readout scan 510 for reading the pixel signals of the pixels of even-numbered field 1 in the shorter accumulation period operation is started after the reset scan 509 for resetting the pixel signals of the pixels of odd-numbered field 2 in the longer accumulation period operation has started. In addition, the readout scan 510 for reading the pixel signals of the pixels of even-numbered field 1 in the shorter accumulation period operation is started before the reset scan 512 for resetting the pixel signals of the pixels of even-numbered field 2 in the longer accumulation period operation is started.

The readout row counter 151 generates the row address for interlaced readout of an odd-numbered field and an even-numbered field. When two types of accumulation operation, one with a shorter accumulation period and the other with a longer accumulation period compared to a field readout cycle, are switched between, the two reset row counters 152 and 153 perform the following operation. The two reset row counters 152 and 153 generate row addresses such that row resetting of the odd-numbered field and row resetting of the even-numbered field are performed so as to respectively skip the readout rows of the even-numbered field and the odd-numbered field.

As illustrated in FIG. 3, the row counter control unit 18 includes the first counter start pulse generation circuit R (407), the horizontal synchronization signal counter 414, the second counter start pulse generation circuit A (417), and the third counter start pulse generation circuit B (421). The first counter start pulse generation circuit R (407) generates the counter start pulse 415 for making the readout row counter 151 start counting. The second horizontal synchronization signal counter 414 is reset at the timing of the vertical synchronization signal 20 and counts up at the timing of the horizontal synchronization signal 21. The counter start pulse generation circuit A (417), in accordance with the counter value of the horizontal synchronization signal counter 414, generates the counter start pulse 418 for making the reset row counter A (152) start counting. The third counter start pulse generation circuit B (421), in accordance with the counter value of the horizontal synchronization signal counter 414, generates the counter start pulse 422 for making the second reset row counter B (153) start counting.

Since switching of thinned-out rows for reading the pixel portion is not performed between different modes, shooting of natural-looking moving images without a change in the image quality before and after switching between a shorter accumulation period operation and the first operation mode is possible.

Second Embodiment

A solid-state image pickup device according to a second embodiment of the present invention will be described centering around the difference from the first embodiment. The configuration of the solid-state image pickup device in the present embodiment is the same as that illustrated in FIG. 1A, and operations other than the row counter control unit 18 are also the same as those in the first embodiment.

Figure 5:
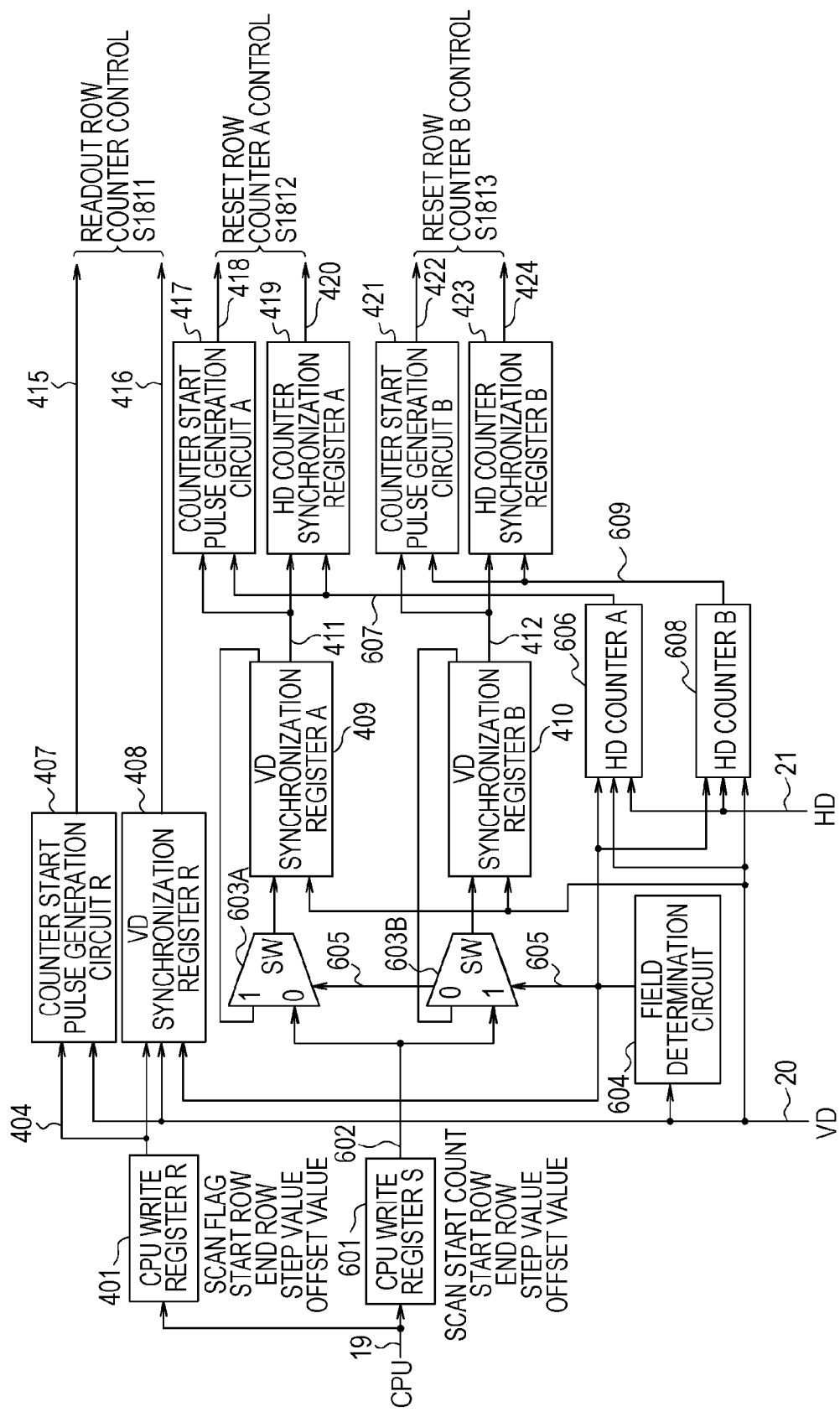
FIG. 5 is a block diagram illustrating an exemplary configuration of a row counter control unit according to a second embodiment.

FIG. 5 illustrates an exemplary configuration of a row counter control unit 18 according to the second embodiment. Hereinafter, description is made of an operation in which the timing of communication started by an external CPU is the same irrespective of whether the exposure period is shorter or longer than a vertical synchronization period. A field determination circuit 604 outputs a field determination result 605 which alternately changes between "0" and "1" in synchronization with the vertical synchronization signal 20. The operations of the CPU write register R (401), the counter start pulse generation circuit R (407), and the VD synchronization register R (408) are the same as those described referring to FIG. 3. However, a register is added for storing an offset value which is a difference in readout start row between a reference odd-numbered field and an even-numbered field. When a start row and an end row are copied from the CPU write register R (401) to the VD synchronization register R (408) in synchronization with the vertical synchronization signal 20, the field determination result 605 is referred to, and if the result is "0", the rows are copied as they are, and if the result is "1", the rows are copied after addition of the offset value.

A CPU write register S (601) is a setting register common to the reset row counter A (152) and the reset row counter B (153). The CPU write register S (601) stores a reset scan start count, a reset start row, a reset end row, a step value for counting up, and an offset value which is a difference in reset start row between a reference odd-numbered field and an even-numbered field. When the value of the CPU write register S (601) is copied to the VD synchronization register A (409) through a switch 603A in synchronization with the vertical synchronization signal 20, copying is performed if the field determination result 605 is "0", and if the result is "1", the VD synchronization register A (409) holds the current value. When the value of the CPU write register S (601) is copied to the VD synchronization register B (410) through a switch 603B in synchronization with the vertical synchronization signal 20, copying is performed if the field determination result 605 is "1", and if the result is "0", the VD synchronization register B (410) holds the current value. Further, when the start row and end row in the CPU write register S (601) are copied to the VD synchronization register B (410), the offset value is added to the copied value.

An HD counter A (606) is a counter which is reset at the timing of the vertical synchronization signal 20 only when the field determination result 605 is "0", and performs counting up at the timing of the horizontal synchronization signal 21. An HD counter B (608) is a counter which is reset at the timing of the vertical synchronization signal 20 only when the field determination result 605 is "1", and performs counting up at the timing of the horizontal synchronization signal 21. Note that the HD counter A (606) and the HD counter B (608) are counters which can count the number of pulses of the horizontal synchronization signal 21 which are input during two vertical synchronization periods. The counter start pulse generation circuit A (417) and the HD counter synchronization register A (419) perform the same operations as described referring to FIG. 3, except that an output signal (HD counter A value) 607 of the HD counter A (606) is referred to in the present embodiment. The counter start pulse generation circuit B (421) and the HD counter synchronization register B (423) perform the same operations as described referring to FIG. 3, except that an output signal (HD counter B value) 609 of the HD counter B (608) is referred to in the present embodiment.

Figure 6:
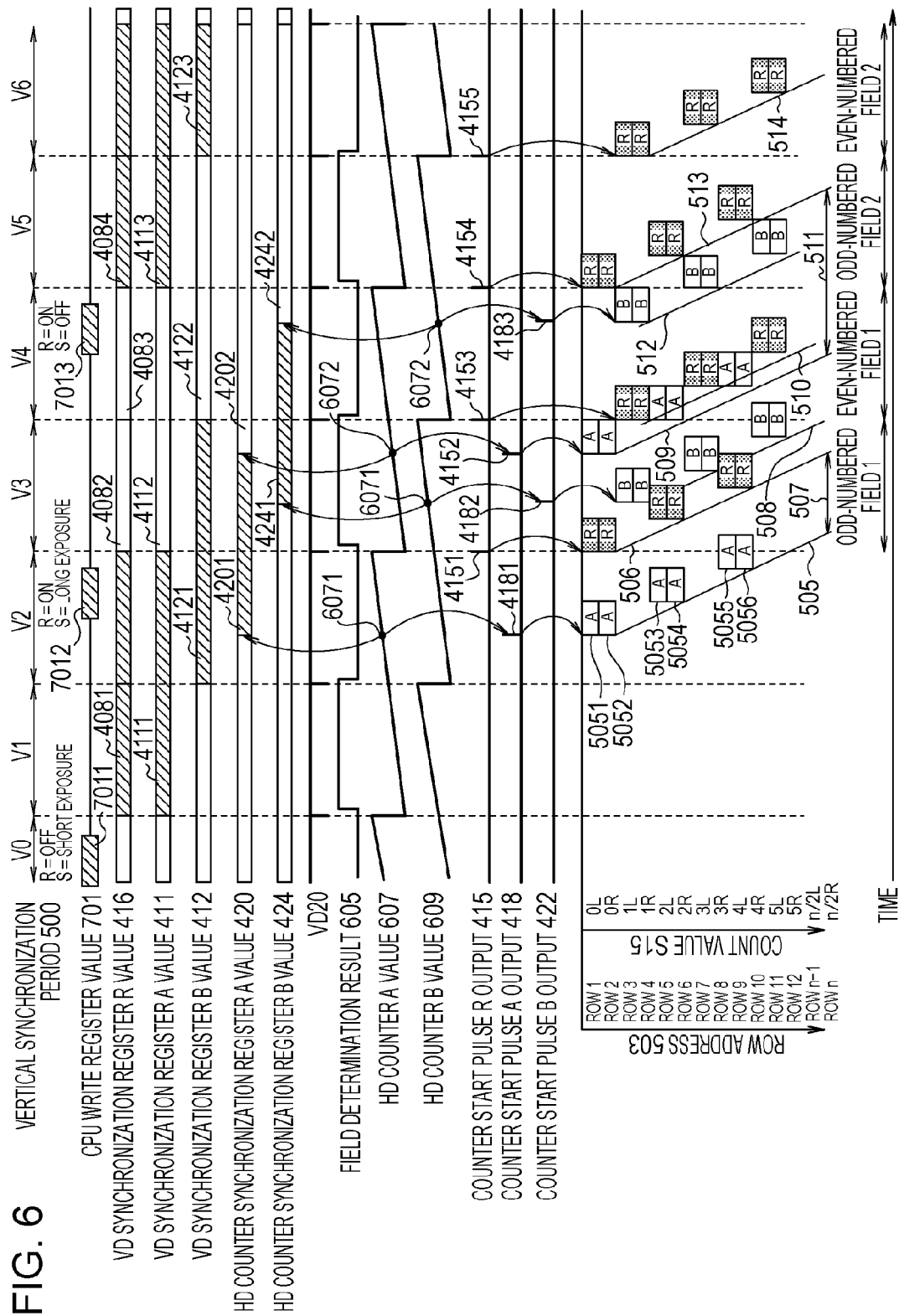
FIG. 6 is a timing diagram illustrating the operation of the solid-state image pickup device according to the second embodiment.

FIG. 6 is a timing diagram illustrating the operation of the row counter control unit 18 according to the second embodiment and the operations of the readout row counter 151, the reset row counter A (152), and the reset row counter B (153) based on the control signal of the row counter control unit 18. The field determination result 605, which is the output of the field determination circuit 604, alternately shows "0" and "1" in synchronization with the vertical synchronization signal 20. The HD counter A value (607) is reset in synchronization with the vertical synchronization signal 20 when the field determination result 605 is "0", and performs counting up at every input of the horizontal synchronization signal 21. The HD counter B value (609) is reset in synchronization with the vertical synchronization signal 20 when the field determination result 605 is "1" and performs counting up at every input of the horizontal synchronization signal 21. The operations and timings of the counter start pulse R output (415), the counter start pulse A output (418), the counter start pulse B output (422), the reset scans A (505, 509), and the reset scans B (508, 512) are the same as those illustrated in FIG. 3. The operations and timings of the readout scans 506, 510, 513, and 514 are also the same as those illustrated in FIG. 3.

The operations illustrated in FIG. 6 will now be described. First, in period V0, through communication 7011 started by a CPU, a readout scan flag is set to "0" (scan is off) in the CPU write register R (401) so as to instruct prohibition of a readout scan. The HD counter value A (6071) is written into the CPU write register S (601) as a reset scan start count. Similarly, "0" is written as a reset start row, "n/2−1" is written as a reset end row, "2" is written as a step value for counting up, and "1" is written as an offset value. At this time, a reset scan start count value 6071 is larger than the number of pulses of the horizontal synchronization signal 21 input during one vertical synchronization period.

During period V1, the value of the CPU write register R (401) is copied (4081) to the VD synchronization register R (408) in synchronization with the vertical synchronization signal 20. Since the field determination result 605 is "0" at the input timing of the vertical synchronization signal 20 during period V1, the value of the CPU write register S (601) is copied (4111) to the VD synchronization register A (409) through the switch 603A. On the other hand, the VD synchronization register B (410) holds the current value, since copying is not performed through the switch 603B. However, the value of the CPU write register S (601) is copied (4121) to the VD synchronization register B (410) at the timing when the field determination result 605 becomes "1" during period V2. At this time, values to which an offset value has been added is stored in the VD synchronization register B (410) as a reset start row and a reset end row.

During period V2, when the HD counter A value 607 matches the reset scan start count value 6071 of a VD synchronization register A value (411), the VD synchronization register A value (411) is copied to the HD counter synchronization register A (419). Then the counter start pulse generation circuit A (417) generates the start pulse 4181, whereby the reset scan A (505) is performed. Further, during period V2, the following is written into the CPU write register R (401) through communication 7012: "1" (scan is on) as a readout scan flag, "0" as a readout start row, "n/2−1" as a readout end row, "2" as a step value, and "1" as an offset value. The following is written into the CPU write register S (601): the HD counter A value (6072) as a reset scan start count, "0" as a reset start row, "n/2−1" as a reset end row, "2" as a step value for counting up, and "1" as an offset value. At this time, a reset scan start count value 6072 is smaller than the number of pulses of the horizontal synchronization signal 21 input during one vertical synchronization period.

During period V3, a CPU write register value 701 as a result of communication 7012 is copied (4082) to the VD synchronization register R 408. At this time, since the field determination result 605 is "0", the CPU write register value 701 is copied to the VD synchronization register A (409) but not to the VD synchronization register B (410). Since the readout scan flag is "1" (scan is on), the counter start pulse generation circuit R (407) generates the start pulse 4151. Upon receipt of the start pulse 4151, the readout row counter 151 starts the readout scan (506) on the basis of the readout start row "0", the readout end row "n/2−1", and the step value "2" for counting up performed by the readout row counter.

Next, when the HD counter value B (609) matches the reset scan start count value (6071), which is the reset scan start count stored in the VD synchronization register B (410), the value of the VD synchronization register B (410) is copied (4241) to the HD counter synchronization register B (423). Further, the counter start pulse generation circuit B (421) generates the start pulse 4182 for the reset row counter B (153). Upon receipt of the start pulse 4182, the reset row counter B (153) starts the reset scan B (508) on the basis of the reset start row "1" and the reset end row of "n/2", after addition of the offset, and the count up step value "2".

Next, when the HD counter A value 607 matches the reset scan start count value (6072) of the VD synchronization register A (409), which is a reset scan start count stored in the VD synchronization register A (409), the value of the VD synchronization register A (409) is copied (4202) to the HD counter synchronization register A (419). Further, the counter start pulse generation circuit A (417) generates the start pulse 4152 for the reset row counter A (152). Upon receipt of the start pulse 4152, the reset row counter A (152) starts the reset scan A (509).

During V4, the CPU write register value 701 as a result of the communication 7012 during period V3, is copied (4083) to the VD synchronization register R (408). At this time, since the field determination result 605 is "1", an offset value of "1" is added to the readout start row and readout end row stored in the VD synchronization register R 408. Similarly, the VD synchronization register A (409) is not copied, and the offset value "1" is added in the VD synchronization register B (410). The counter start pulse generation circuit R (407), since the readout scan flag is "1" (scan is on), generates a start pulse 4153. Upon receipt of the start pulse 4153, the readout row counter 151 starts the readout scan (510) using the readout start row "1" and readout end row "n/2" to which the offset has been added.

Next, when the HD counter B value (609) matches the reset scan start count value (6072), which is the reset scan start count stored in the VD synchronization register B (410), the value of the VD synchronization register B (410) is copied (4242) to the HD counter synchronization register B (423). Further, the counter start pulse generation circuit B (421) generates a start pulse 4183 for the reset row counter B (153). Upon receipt of the start pulse 4183, the reset row counter B (153) starts the reset scan B (512) on the basis of the reset start row "1" and the reset end row "n/2", after addition of the offset, and the count up step value "2".

After this, setting for readout scans 513 and 514 and for prohibition of a reset scan during periods V5 and V6 is similarly made by communication 7013, as illustrated in the figure. Thus, the exposure periods 507 and 511 are controlled similarly to the first embodiment. In addition, irrespective of whether the exposure period is longer or shorter than a vertical synchronization period, it is only required that communication be always made two vertical scan periods in advance with respect to the readout period of an odd-numbered field, as illustrated in the figure.

As illustrated in FIG. 5, the row counter control unit 18 includes the first counter start pulse generation circuit R (407), the second counter start pulse generation circuit A (417), and the third counter start pulse generation circuit B (421). Further, the row counter control unit 18 includes the first horizontal synchronization signal counter A (606) and the second horizontal synchronization signal counter B (608). The first counter start pulse generation circuit R (407) generates the counter start pulse 415 for making the readout row counter 151 start counting. The first horizontal synchronization signal counter A (606) is reset at the timing of every two vertical synchronization signals 20, and is made to perform counting up at the timing of the horizontal synchronization signal 21. The second horizontal synchronization signal counter B (608) is reset at the timing of every two vertical synchronization signals 20 and with an offset of one vertical synchronization signal 20 with respect to the HD counter A (606), and made to perform counting up at the timing of the horizontal synchronization signal 21. The second counter start pulse generation circuit A (417) generates the counter start pulse 418 for making the first reset row counter A (152) start counting in accordance with the count value of the first horizontal synchronization signal counter A (606). The third counter start pulse generation circuit B (421) generates the counter start pulse 422 for making the second reset row counter B (153) start counting in accordance with the counter value of the second horizontal synchronization signal counter B (608).

The solid-state image pickup devices of the first and second embodiments can be used as solid-state image pickup devices for digital cameras and the like. According to the first and second embodiments, switching of thinning-out methods of readout in the pixel portion 11 is not performed between the case in which setting of an accumulation period within one vertical scan period for a shorter accumulation period operation is required and the case in which setting of an accumulation period exceeding one vertical scan period for a longer accumulation period operation is required. This enables shooting of natural-looking moving images without a change in the image quality before and after switching between a shorter accumulation period operation and a longer accumulation period operation. In addition, the image quality in moving image shooting at times of low illuminance is improved, and simplified control thereof is realized.

In the embodiments described above, sets of two of the row address decoders 14, the selection memory units 13, and the pixel driving units 12 are provided. However, the pixel portion 11 may be controlled using just one component from each set. In other words, the total number of decoded values which can be output from a row address decoder becomes double that in the above-described embodiments. As illustrated in FIG. 1, the number of components is large since the selection memory units 13 are formed of logic circuits, latch circuits, and the like. Hence, as the pixels become finer, it becomes more advantageous for realizing easier layout to provide sets of two of the row address decoders 14, the selection memory units 13, and the pixel driving units 12, as illustrated.

Although examples have been shown in which pixels of two neighboring rows are selected as a pair, each row may of course be independently selected. In addition, although description above has been made of examples in which an odd-numbered field (first field) is followed by an even-numbered field (second field), the order in which odd-numbered fields and even-numbered fields are processed may be reversed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-085471 filed Apr. 1, 2010, which is hereby incorporated by reference herein in its entirety.

What is claimed is:

1. A solid-state image pickup device comprising:
   a pixel portion having a plurality of pixels that are arranged in a two-dimensional matrix and generate pixel signals through photoelectric conversion;
   and a pixel driving unit that selects a row of the pixel portion,
   wherein the pixel driving unit drives the pixel portion in a first operation mode such that signals from a part of the rows of the pixel portion are read in a first field, and signals from another part of the rows of the pixel portion are read in a second field subsequent to the first field, and wherein the first operation mode includes, starting a reset scan of the rows of the pixel portion to be read in the first field, thereafter starting a reset scan of the rows of the pixel portion to be read in the second field, thereafter starting, in the first field, a readout scan of the rows of the pixels to be read in the first field, and starting, in the second field, a readout scan of the rows to be read in the second field, the length of period of time from the starting of the reset scan and the starting of the corresponding readout scan being longer than the period of the first or second field.

2. The solid-state image pickup device according to claim 1, wherein the driving unit further selects an odd-numbered row and a neighboring even-numbered row of the pixel portion corresponding to the selected row address.

3. The solid-state image pickup device according to claim 1, wherein the pixel driving unit further drives in a second operation mode such that signals from a part of the rows of the pixel portion are read in a first field, and signals from another part of the rows of the pixel portion are read in a second field subsequent to the first field, wherein the second operation mode includes, starting a reset scan of the rows of the pixel portion to be read in the first field, thereafter starting, in the first field, a readout scan of the rows of the pixels to be read in the first field, thereafter starting a reset scan of the rows of the pixel portion to be read in the second field, and starting, in the second field, a readout scan of the rows to be read in the second field.

4. The solid-state image pickup device according to claim 3, wherein, when an operation in the first operation mode is performed following an operation in the second mode, the readout scan of the pixel signals of the pixels of the second field in the second operation mode is started after the reset scan of the pixel signals of the pixels of the first field in the first operation mode has been started and before the reset scan of the pixel signals of the pixels of the second field in the first operation mode is started.

5. The solid-state image pickup device according to claim 1, further comprising:
a row counter control unit that controls the readout row counter, the first reset row counter, and the second reset row counter,
wherein the row counter control unit includes:
a first counter start pulse generation circuit that generates a count start pulse for making the readout row counter start counting;
a horizontal synchronization signal counter that is reset at a timing of a vertical synchronization signal and performs counting up at a timing of a horizontal synchronization signal;
a second counter start pulse generation circuit that, in accordance with a counter value of the horizontal synchronization signal counter, generates a counter start pulse for making the first reset row counter start counting; and
a third counter start pulse generation circuit that, in accordance with a counter value of the horizontal synchronization signal counter, generates a counter start pulse for making the second reset row counter start counting.

6. The solid-state image pickup device according to claim 1, further comprising:

a row counter control unit that controls the readout row counter, the first reset row counter, and the second reset row counter,
wherein the row counter control unit includes:
a first counter start pulse generation circuit that generates a count start pulse for making the readout row counter start counting;
a first horizontal synchronization signal counter that is reset at a timing of every two vertical synchronization signals, and performs counting up at a timing of a horizontal synchronization timing;
a second horizontal synchronization signal counter that is reset at a timing of every two vertical synchronization signals and with an offset of one vertical synchronization signal with respect to the first horizontal synchronization signal counter, and performs counting up at a timing of a horizontal synchronization timing;
a second counter start pulse generation circuit that, in accordance with a counter value of the first horizontal synchronization signal counter, generates a counter start pulse for making the first reset row counter start counting; and
a third counter start pulse generation circuit that, in accordance with a counter value of the second horizontal synchronization signal counter, generates a counter start pulse for making the second reset row counter start counting.

7. A solid-state image pickup device comprising:
a row address generation unit including one readout row counter and two reset row counters;
a row counter control unit that controls the readout row counter and the reset row counters;
a selector that selects a row address generated by the row address generation unit;
a row address decoder that decodes the selected row address;
a storage unit that receives output bits of the address decoder as an input and stores a state of the output bits; and
a pixel driving unit that outputs a row selection signal corresponding to the stored output bits,
wherein the readout row counter generates a row address for interlaced readout of a first field and a second field, and
wherein, when an accumulation operation with a shorter accumulation period and another accumulation operation with a longer accumulation period, with respect to a field readout cycle, are switched between, the two reset row counters generate row addresses such that row resetting of the first field and row resetting of the second field are performed so as to respectively skip the readout rows of the second field and the first field.

8. A method of driving a solid-state image pickup device that includes a pixel portion having a plurality of pixels that are arranged in a two-dimensional array and generate pixel signals through photoelectric conversion, and a pixel driving unit that selects a row of the pixel portion, the method comprising:
starting a sequential resetting of rows of the pixel portion to be read in a first field, thereafter starting a sequential resetting of rows of the pixel portion to be read in pixels of the second field, thereafter starting, in the first field, a sequential readout of the pixel signals of the pixel portion to be read in the first field, and thereafter starting, in the second field, a sequential readout of the pixel signals of the pixel portion to be read in the second field, the length of period of time from the starting of the reset scan and the starting of the corresponding readout scan being longer than the period of the first or second field.

9. The method according to claim 8, further comprising selecting an odd-numbered row and a neighboring even-numbered row of the pixel portion corresponding to a selected row address.

10. The method according to claim 8, further comprising:
generating row addresses for reading the pixel portion;
generating a row address for resetting a row of the pixel portion in a first field;
generating a row address for resetting a row of the pixel portion in a second field, the second field following the first field;
selecting one of the row addresses respectively, the row address for resetting in the first field, and the row address for resetting in the second field; and
selecting a row of the pixel portion corresponding to the selected row address.

11. The method according to claim 10, further including:
generating a count start pulse for making the readout row counter start counting;
resetting at a timing of a vertical synchronization signal and performing counting up at a timing of a horizontal synchronization signal;
generating a counter start pulse for making the first reset row counter start counting in accordance with a counter value of the horizontal synchronization signal counter; and
generating a counter start pulse for making the second reset row counter start counting in accordance with a counter value of the horizontal synchronization signal counter.

12. The method according to claim 10, further including:
generating a count start pulse for making the readout row counter start counting;
resetting at a timing of every two vertical synchronization signals, and performing counting up at a timing of a horizontal synchronization timing;
resetting at a timing of every two vertical synchronization signals and with an offset of one vertical synchronization signal with respect to the first horizontal synchronization signal counter, and performing counting up at a timing of a horizontal synchronization timing.

13. The method according to claim 12, further including:
generating a counter start pulse for making the first reset row counter start counting in accordance with a counter value of the first horizontal synchronization signal counter; and
generating a counter start pulse for making the second reset row counter start counting in accordance with a counter value of the second horizontal synchronization signal counter.

14. A solid-state image pickup device comprising:
a pixel portion having a plurality of pixels that are arranged in a two-dimensional matrix and generate pixel signals through photoelectric conversion; and
a pixel driving unit that selects a row of the pixel portion;
wherein the pixel driving unit drives the pixel portion in a first operation mode such that signals from a part of the rows of the pixel portion are read in a first field, and signals from another part of the rows of the pixel portion are read in a second field subsequent to the first field,
wherein the first operation mode includes, starting a reset scan of the rows of the pixel portion to be read in the first field, thereafter starting a reset scan of the rows of the pixel portion to be read in the second field, thereafter starting, in the first field, a readout scan of the rows of the pixels to be read in the first field, and starting, in the second field, a readout scan of the rows to be read in the second field,
wherein the pixel driving unit further drives in a second operation mode such that signals from a part of the rows of the pixel portion are read in a first field, and signals from another part of the rows of the pixel portion are read in a second field subsequent to the first field,
wherein the second operation mode includes, starting a reset scan of the rows of the pixel portion to be read in the first field, thereafter starting, in the first field, a readout scan of the rows of the pixels to be read in the first field, thereafter starting a reset scan of the rows of the pixel portion to be read in the second field, and starting, in the second field, a readout scan of the rows to be read in the second field,
wherein, when an operation in the first operation mode is performed following an operation in the second mode, the readout scan of the pixel signals of the pixels of the second field in the second operation mode is started after the reset scan of the pixel signals of the pixels of the first field in the first operation mode has been started and before the reset scan of the pixel signals of the pixels of the second field in the first operation mode is started.

* * * * *